United States Patent
Yang (10) Patent No.: US 9,205,863 B2
(45) Date of Patent: Dec. 8, 2015

(54) CONTROL APPARATUS OF MOTOR DRIVEN POWER STEERING

(71) Applicant: HYUNDAI MOBIS CO., LTD., Seoul (KR)

(72) Inventor: Seung Hoon Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/090,548

(22) Filed: Nov. 26, 2013

(65) Prior Publication Data

US 2015/0066302 A1 Mar. 5, 2015

(30) Foreign Application Priority Data

Aug. 29, 2013 (KE) .................. 10-2013-0103487

(51) Int. Cl.
*B62D 5/04* (2006.01)
(52) U.S. Cl.
CPC .................... *B62D 5/0472* (2013.01)
(58) Field of Classification Search
CPC .............. B62D 5/00; B62D 5/02; B62D 5/04; B62D 5/0457; B62D 5/046; B62D 5/0463; B62D 5/0472; B62D 6/00; B62D 6/02; B62D 6/04; B62D 6/06; B62D 6/08; B62D 6/10; B60W 10/20; H04B 1/1036; H04B 2001/1063

See application file for complete search history.

(56) References Cited

U.S. PATENT DOCUMENTS

2008/0277192 A1* 11/2008 Nishimura ................ 180/444
2008/0296085 A1* 12/2008 Suzuki ...................... 180/444

* cited by examiner

*Primary Examiner* — Jerrah Edwards
(74) *Attorney, Agent, or Firm* — Knobbe Martens Olson & Bear, LLP (57) ABSTRACT

A control apparatus of a motor-driven power steering (MDPS) includes: a torque sensor configured to measure a driver's steering torque inputted to a steering wheel and output a steering torque signal; a steering angle sensor configured to measure a steering angle of the steering wheel; a variable notch filter configured to reduce a torque ripple for the steering torque signal depending on a steering angle speed which is a change rate of the steering angle with respect to time; a vehicle speed sensor configured to measure vehicle speed; and a controller configured to receive the steering angle, the steering torque signal, and the vehicle speed from the steering angle sensor, the variable notch filter, and the vehicle sensor, respectively, and control drivability of a driving motor according to a driving speed of a vehicle.

18 Claims, 7 Drawing Sheets

CONTROL APPARATUS OF MOTOR DRIVEN POWER STEERING

CROSS-REFERENCES TO RELATED APPLICATIONS

The present application claims priority to Korean application number 10-2013-0103487, filed on Aug. 29, 2013, which is incorporated by reference in its entirety.

BACKGROUND OF THE INVENTION

The present invention relates to a control apparatus of a motor-driven power steering (MDPS), and more particularly, to a control apparatus of an MDPS, which is capable of selectively removing booming vibrations which occur depending on a steering angle speed, thereby reducing steering vibrations.

In general, an MDPS refers to a system which uses an electric motor to provide an auxiliary torque along a direction where a driver steers a vehicle, thereby facilitating handling.

Such an MDPS automatically controls the operation of the electric motor according to a driving condition of the vehicle, unlike an existing hydraulic power steering (HPS). Thus, the MDPS may improve steering performance and steering feeling.

At this time, the MDPS determines a driving condition of the vehicle through a torque sensor to measure a driver's steering torque inputted to a steering wheel, a steering angle sensor to measure a steering angle of the steering wheel, and a vehicle speed sensor to measure vehicle speed, and provides an auxiliary torque through the electric motor according to the steering torque applied to the steering wheel by the driver.

Furthermore, the MDPS sets an auxiliary torque proportional to the steering torque, applies a proportional gain to maintain the proportional relation, and reduces or smoothes a steering force of the driver. Simultaneously, the MDPS suppresses torque ripples generated by the electric motor or vibrations such as disturbance transmitted from the ground, thereby improving the driver's feeling.

In order to suppress the torque ripples generated from the electric motor or vibrations such as ground disturbance, the MDPS uses a hybrid filter including a low pass filter (LPF) and a high pass filter (HPF), and extracts a steering component through the LPF so as to control the steering auxiliary torque. Simultaneously, the MDPS extracts high-frequency vibration components such as torque ripples through the HPF, and controls the high-frequency vibration components using a controller different from a controller for a low frequency.

Furthermore, the MDPS extracts an RPM of the electric motor or angular speed vibration component of the steering angle using a band pass filter (BPF), reduces a signal obtained by adding a gain to the vibration component from a target current, calculates a new target current, and performs negative feedback control for the angular speed, thereby reducing vibration.

As such, the vibration caused by the torque ripples are removed through the hybrid filter or BPF. However, the MDPS has a problem in that it does not properly deal with booming vibrations caused by a worm wheel depending on steering angle speed.

SUMMARY OF THE INVENTION

Embodiments of the present invention are directed to a control apparatus of an MDPS, which is capable of selectively removing booming vibrations which occur depending on a steering angle speed, thereby reducing steering vibrations.

In one embodiment, a control apparatus of a motor-driven power steering (MDPS) includes: a torque sensor configured to measure a driver's steering torque inputted to a steering wheel and output a steering torque signal; a steering angle sensor configured to measure a steering angle of the steering wheel; a variable notch filter configured to reduce a torque ripple for the steering torque signal depending on a steering angle speed which is a change rate of the steering angle with respect to time; a vehicle speed sensor configured to measure vehicle speed; and a controller configured to receive the steering angle, the steering torque signal, and the vehicle speed from the steering angle sensor, the variable notch filter, and the vehicle sensor, respectively, and control drivability of a driving motor according to a driving speed of a vehicle.

The variable notch filter may reduce a torque ripple at a preset order.

The preset order of the variable notch filter may correspond to the gear teeth number of a worm wheel for transmitting the drivability of the driving motor to the steering wheel.

The preset order may include 20.5-th order and 41st order.

The variable notch filter may have a notch which is varied with the increase of the steering angle speed.

The notch of the variable notch filter may be linearly varied at a steering angle speed of 1 rps to 2 rps.

The variable notch filter may have a notch of 41 Hz when the steering angle speed is 1 rps, and may have a notch of 82 Hz when the steering angle speed is 2 rps.

The variable notch filter may be operated when the steering angle speed is equal to or more than preset speed.

The preset speed may be 1 rps (360 deg/sec).

The variable notch filter may have a transfer function defined as follows:

$$\frac{X(s)}{Y(s)} = \frac{s^2 + 2\zeta\alpha + \alpha^2}{\left(s + \frac{\alpha}{\beta}\right)(s + \alpha\beta)}.$$

Here, $\alpha = \text{order} \times 2 \times \pi \times \dot{\theta}$, $\beta$ represents the depth of a notch, $\zeta$ represents the width of the notch, and $\dot{\theta}$ represents the steering angle speed.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
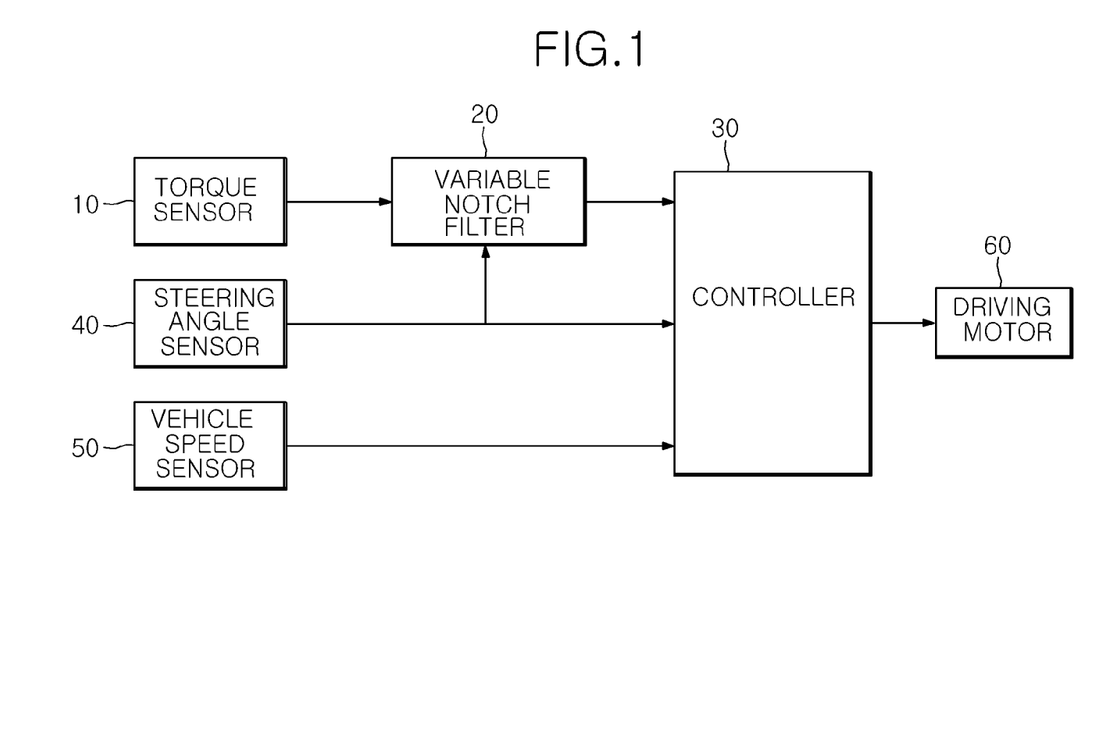
FIG. 1 is a block configuration diagram of a control apparatus of an MDPS in accordance with an embodiment of the present invention.
Figure 2:
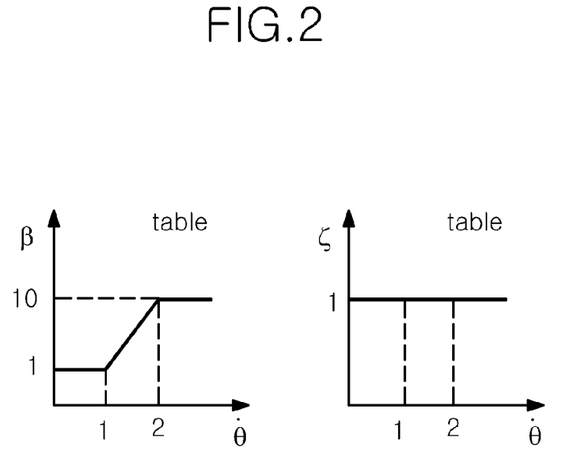
FIG. 2 is a graph illustrating characteristics of a variable notch filter in the control apparatus of the MDPS in accordance with the embodiment of the present invention.
Figure 3:
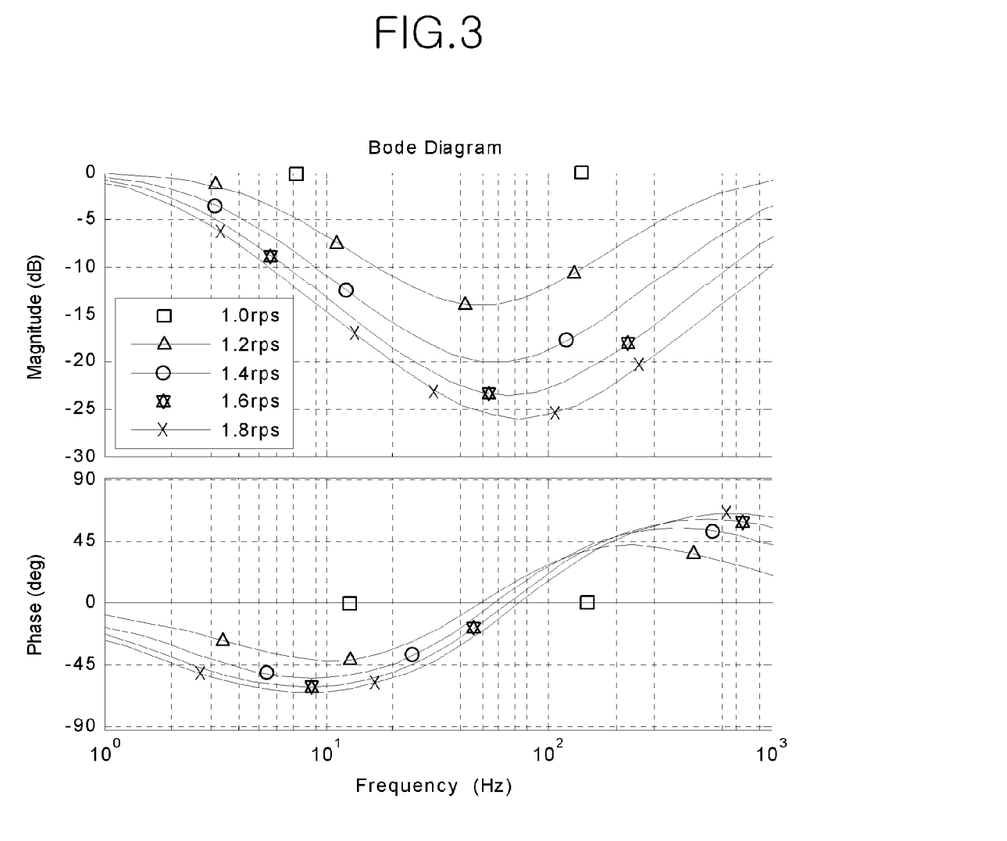
FIG. 3 is a graph illustrating results obtained by simulating the characteristics of the variable notch filter in the control apparatus of the MDPS in accordance with the embodiment of the present invention.

FIG. 1 is a block configuration diagram of a control apparatus of a motor-driven power steering (MDPS) in accordance with an embodiment of the present invention. FIG. 2 is a graph illustrating characteristics of a variable notch filter in the control apparatus of the MDPS in accordance with the embodiment of the present invention. FIG. 3 is a graph illustrating results obtained by simulating the characteristics of the variable notch filter in the control apparatus of the MDPS in accordance with the embodiment of the present invention.

Referring to FIG. 1, the control apparatus of the MDPS in accordance with the embodiment of the present invention includes a torque sensor 10, a steering angle sensor 40, a variable notch filter 20, a vehicle speed sensor 50, and a controller 30.

The torque sensor 10 is configured to measure a steering torque, which is caused by rotation of a steering wheel (not illustrated) when a driver steers the steering wheel, and provide a steering torque signal.

The steering angle sensor 40 is configured to measure a steering angle depending on a steering operation of the steering wheel steered by the driver, and provide the measured steering angle.

The vehicle speed sensor 50 is configured to measure the driving speed of the vehicle and provide the measured speed.

The variable notch filter 20 is configured to reduce a torque ripple for the steering torque signal based on a steering angle speed which is a change rate of the measured steering angle with respect to time, at a preset order.

The steering angle speed may be calculated through changes of the steering angle measured through the steering angle sensor 40.

In the present embodiment, the variable notch filter 20 is set to remove booming vibration caused by a torque ripple at a 41st order. which occur in a quick steering situation where the steering angle speed is high.

At this time, the torque ripple at the 41st order is booming vibration caused by a worm wheel (not illustrated) for transmitting drivability of the driving motor 60 to the steering wheel, and 41 corresponds to a gear teeth number of the worm wheel.

That is, when the gear teeth number of the worm wheel is 41, the torque ripple component at the 41st order excites the frame and steering device of the vehicle, thereby generating booming vibration.

Thus, in order to remove the torque ripple component at the 41st order, the variable notch filter 20 removes the torque ripple component at the 41st order in a quick steering situation, thereby removing the booming vibration.

For this operation, the transfer function of the variable notch filter 20 may be expressed by Equation 1 below.

$$\frac{X(s)}{Y(s)} = \frac{s^2 + 2\zeta\alpha + \alpha^2}{\left(s + \frac{\alpha}{\beta}\right)(s + \alpha\beta)}$$ [Equation 1]

At this time, $\alpha=41(\text{order})\times 2\times\pi\times\dot{\theta}$, $\beta$ represents the depth of a notch, $\zeta$ represents the width of the notch, and $\dot{\theta}$ represents a steering angle speed.

In order to determine whether or not to operate the notch filter, $\beta$ may be set as illustrated in FIG. 2. That is, the notch filter may not be operated at a steering angle speed of less than 1 rps (360 deg/sec), but operated at a steering angle speed of 1 rps or more. Then, filtering may be performed while the notch is linearly increased until the steering angle speed approaches 2 rps.

That is, the notch is set to 41 Hz at the steering angle speed of 1 rps, and set to 81 Hz at the steering angle speed of 2 rps.

Furthermore, $\zeta$ is a value for setting the width of the notch of the notch filter, and set to a constant value regardless of the steering angle speed.

When the variable notch filter 20 having such a transfer function characteristic is simulated according to the steering angle speed, the simulation result may be obtained as illustrated in FIG. 3.

Referring to FIG. 3, when the steering angle speed is less than 1 rps, the notch filter is not operated, and thus filtering is not performed. However, when the steering angle speed is equal to or more than 1 rps, the notch filter is operated to perform filtering, and the point of the notch is changed.

For example, when steering is performed at a steering angle speed of 0.5 rps, the notch filter is not operated. When steering is performed at a steering angle of 1 rps, a notch filter to remove 41 Hz is applied, and when steering is performed at a steering angle of 1.5 rps, a notch filter to remove 61.5 Hz is applied.

Furthermore, when $\zeta$ is varied according to the steering angle speed in order to provide an optimal steering feel, the width of the notch may also be adjusted.

The controller 30 receives the steering angle, the steering torque signal, and the vehicle speed from the steering angle sensor 40, the variable notch filter 20, and the vehicle speed sensor 50, controls the drivability of the driving motor 60 according to the driving speed of the vehicle, provides an auxiliary torque to the steering wheel manipulated by the driver, and assists the driver to softly steer the steering wheel at low speed or heavily steer the steering wheel at high speed, thereby securing driving stability.

That is, the auxiliary torque is inverse proportional to the driving speed.

Figure 4A:
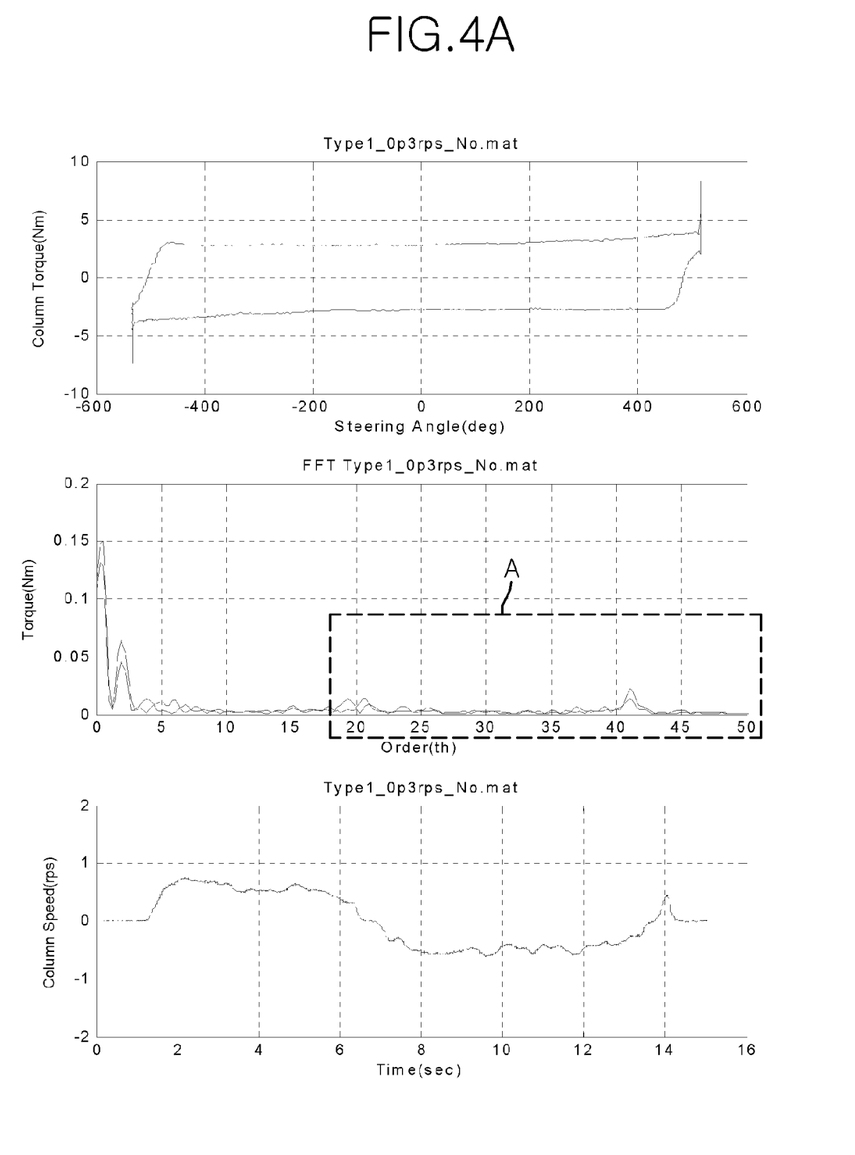
FIGS. 4A and 4B are graphs for explaining the operation state of the variable notch filter in a general steering situation, when the control apparatus of the MDPS in accordance with the embodiment of the present invention is applied.
Figure 4B:
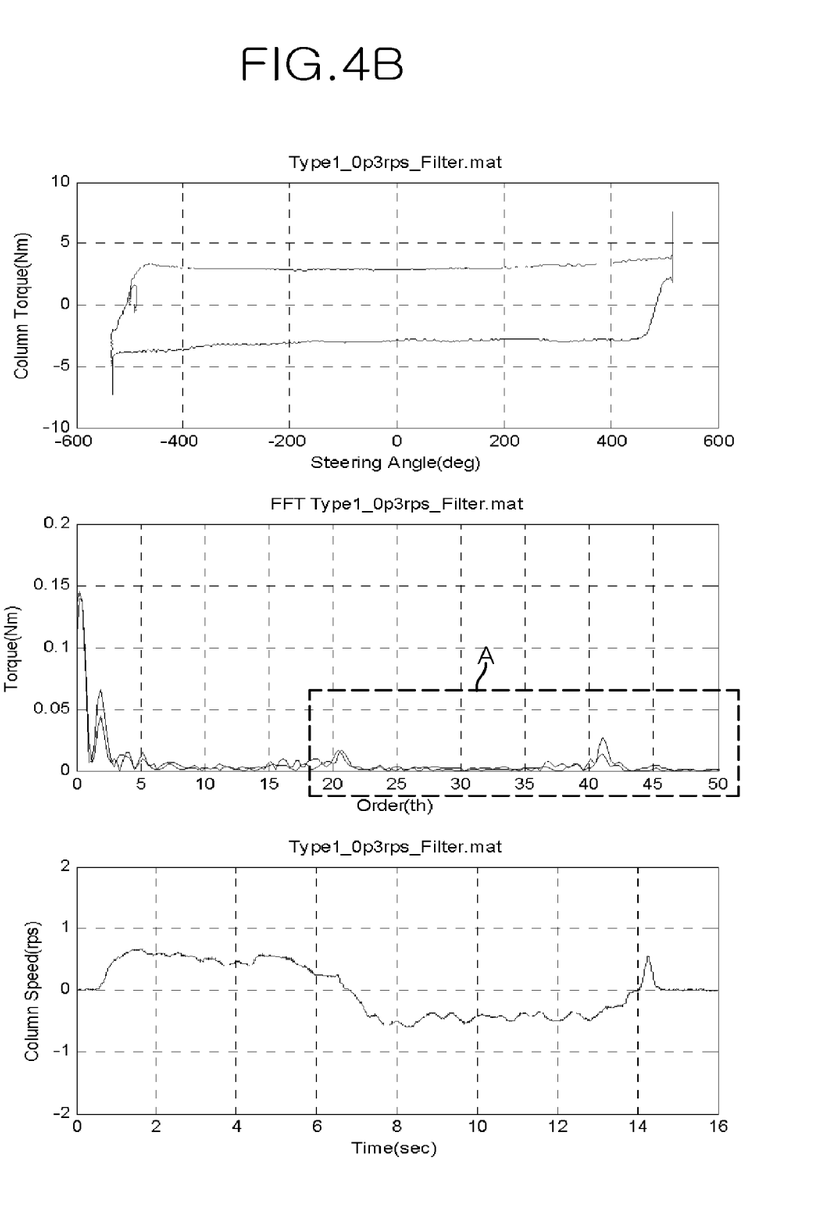
Figure 5A:
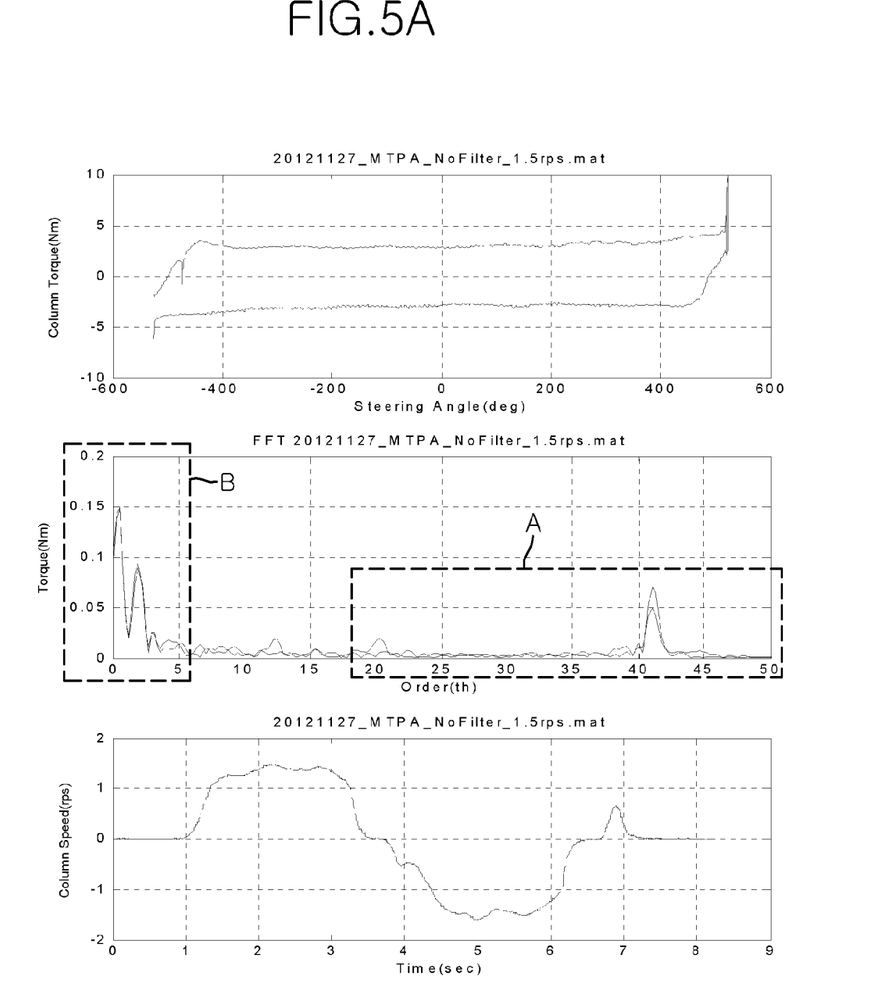
FIGS. 5A and 5B are graphs for explaining the operation state of the variable notch filter in a quick steering situation, when the control apparatus of the MDPS in accordance with the embodiment of the present invention is applied.
Figure 5B:
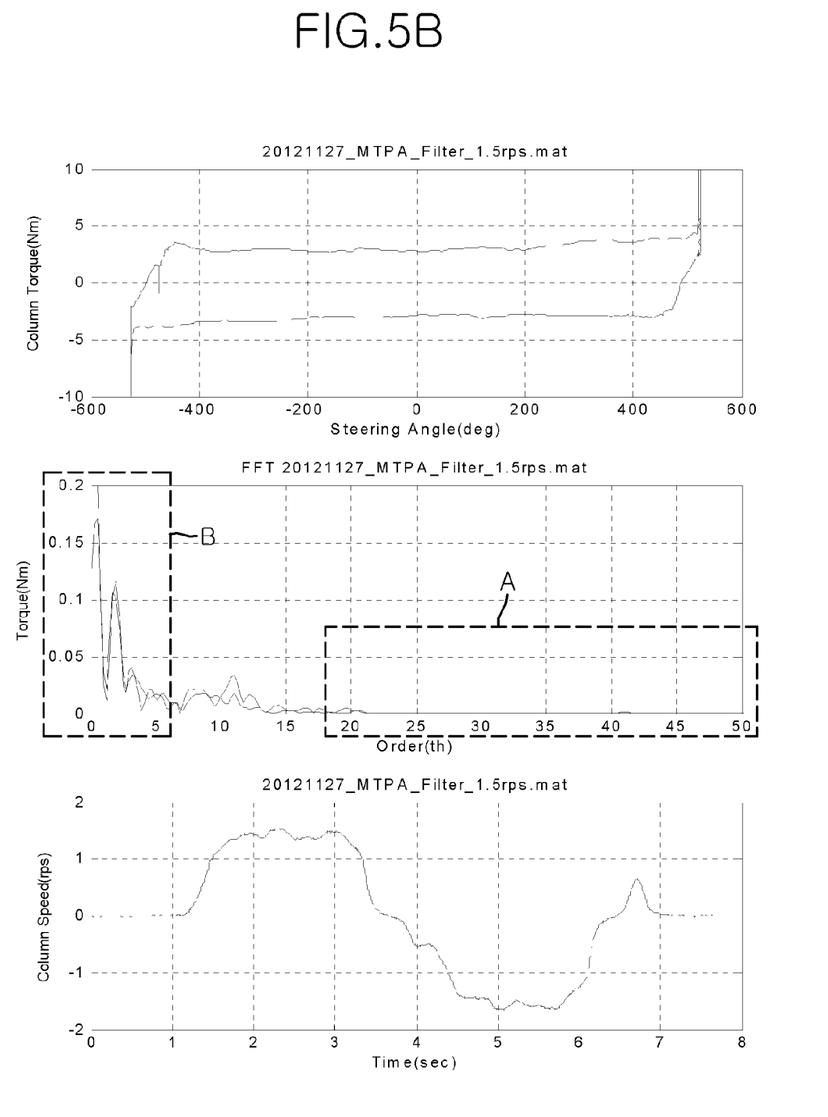

FIGS. 4A and 4B are graphs for explaining the operation state of the variable notch filter in a general steering situation, when the control apparatus of the MDPS in accordance with the embodiment of the present invention is applied. FIGS. 5A and 5B are graphes for explaining the operation state of the variable notch filter in a quick steering situation, when the control apparatus of the MDPS in accordance with the embodiment of the present invention is applied.

FIGS. 4 and 5 illustrate a steering torque signal based on each steering angle, a torque FFT-converted for the steering torque signal at each order, and a steering angle speed based on time, when the variable notch filter 20 is not applied and when the variable notch filter 20 is applied, respectively.

FIGS. 4A and 4B illustrate a test result in a general steering situation in which the steering angle speed is 0.5 rps. Referring to a portion A of FIG. 4A in which the variable notch filter 20 is not applied and a portion A of FIG. 4B in which the variable notch filter 20 is applied, vibration components slightly increase at 20.5-th and 41st orders. In this state, however, since booming vibrations do not occurs, the notch filter is not operated.

FIGS. 5A and 5B illustrate a test result in a quick steering situation in which the steering angle speed is 1 rps. Referring to a portion A of FIG. 5A in which the variable notch filter 20 is not applied and a portion B of FIG. 5B in which the variable notch filter 20 is applied, vibration components slightly increase at 0.5-th and second orders in the portion B of FIG. 5B, but do not have an influence on a steering feel.

However, referring to the portion A of FIG. 5A in which the variable notch filter 20 is not applied in a quick steering situation, a considerably large vibration component occurs at the 41st order. However, referring to the portion A of FIG. 5B in which the variable notch filter 20 is applied, the variable components are removed at the 20.5-th and 41st orders.

In accordance with the embodiment of the present invention, the control apparatus of the MDPS selectively removes the booming vibration caused by the worm wheel in a quick steering situation through the variable notch filter which is operated depending on the steering angle speed. Therefore, the control apparatus may reduce steering vibration by removing the booming vibration in a quick steering situation, without having an influence on the steering feel in a general steering situation.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A control apparatus of a motor-driven power steering (MDPS), the control apparatus comprising:
   a torque sensor configured to measure steering torque applied to the steering wheel and to output a steering torque signal indicative of the steering torque;
   a steering angle sensor configured to measure a steering angle of the steering wheel and to output a steering angle signal indicative of the steering angle, wherein a steering angle speed is defined as a rate of the steering angle changes over time;
   a variable notch filter configured to receive and process the steering torque signal and to output a processed steering torque signal, wherein the variable notch filter is configured to reduce a torque ripple in the steering torque signal when the steering angle speed is equal to or higher than a predetermined reference value;
   a vehicle speed sensor configured to measure a vehicle speed and to output a vehicle speed signal indicative of the vehicle speed; and
   a controller configured to control the steering motor based on the steering angle signal, the processed steering torque signal, and the vehicle speed signal from the steering angle sensor, the variable notch filter, and the vehicle sensor, respectively.

2. The control apparatus of claim 1, wherein the variable notch filter reduces a torque ripple at a preset order.

3. The control apparatus of claim 2, wherein the preset order of the variable notch filter corresponds to the number of gear teeth of a worm wheel interconnecting a driving motor and the steering wheel.

4. The control apparatus of claim 3, wherein the preset order comprises 20.5-th order and 41st order.

5. The control apparatus of claim 1, wherein the variable notch filter has a notch which is varied with the increase of the steering angle speed.

6. The control apparatus of claim 5, wherein the notch of the variable notch filter is linearly varied at a steering angle speed of 1 rps to 2 rps.

7. The control apparatus of claim 6, wherein the variable notch filter has a notch of 41 Hz when the steering angle speed is 1 rps, and has a notch of 82 Hz when the steering angle speed is 2 rps.

8. The control apparatus of claim 1, wherein the predetermined reference value is 1 rps (360 deg/sec).

9. The control apparatus of claim 1, wherein the variable notch filter has a transfer function defined as follows:

$$\frac{X(s)}{Y(s)} = \frac{s^2 + 2\zeta\alpha + \alpha^2}{\left(s + \frac{\alpha}{\beta}\right)(s + \alpha\beta)}$$

where
   s represents Laplace variable,
   X(s) represents output of the variable notch filter,
   Y(s) represents input of the variable notch filter,
   $\alpha = \text{order} \times 2 \times \pi \times \dot{\theta}$,
   β represents the depth of a notch, ζ represents the width of the notch, and
   $\dot{\theta}$ represents the steering angle speed.

10. An automobile comprising:
    a steering wheel;
    a driving motor; and
    the control apparatus of claim 1.

11. The automobile of claim 10, wherein the variable notch filter reduces a torque ripple at a preset order.

12. The automobile of claim 11, wherein the preset order of the variable notch filter corresponds to the number of gear teeth of a worm wheel interconnecting a driving motor and the steering wheel.

13. The automobile of claim 12, wherein the preset order comprises 20.5-th order and 41st order.

14. The automobile of claim 10, wherein the variable notch filter has a notch which is varied with the increase of the steering angle speed.

15. The automobile of claim 14, wherein the notch of the variable notch filter is linearly varied at a steering angle speed of 1 rps to 2 rps.

16. The automobile of claim 15, wherein the variable notch filter has a notch of 41 Hz when the steering angle speed is 1 rps, and has a notch of 82 Hz when the steering angle speed is 2 rps.

17. The automobile of claim 10, wherein the predetermined reference value is 1 rps (360 deg/sec).

18. The automobile of claim 10, wherein the variable notch filter has a transfer function defined as follows:

$$\frac{X(s)}{Y(s)} = \frac{s^2 + 2\zeta\alpha + \alpha^2}{\left(s + \frac{\alpha}{\beta}\right)(s + \alpha\beta)}$$

where
   s represents Laplace variable,
   X(s) represents output of the variable notch filter,
   Y(s) represents input of the variable notch filter,
   $\alpha = \text{order} \times 2 \times \pi \times \dot{\theta}$,
   β represents the depth of a notch, ζ represents the width of the notch, and
   $\dot{\theta}$ represents the steering angle speed.

* * * * *